July 5, 1938. E. J. WITCHGER 2,122,875
TRY-SQUARE
Filed Nov. 4, 1937
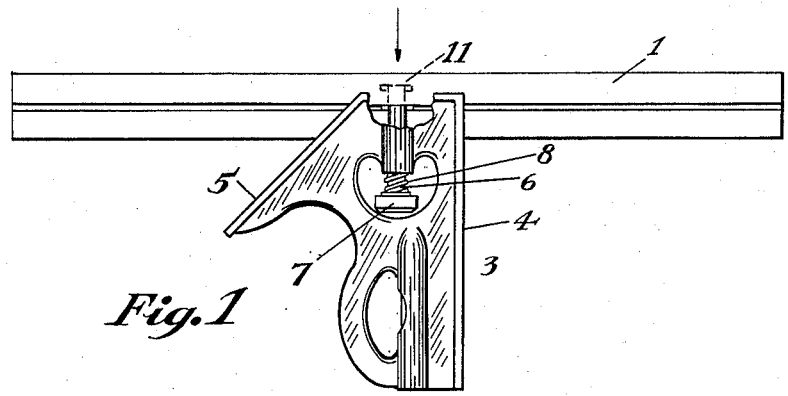
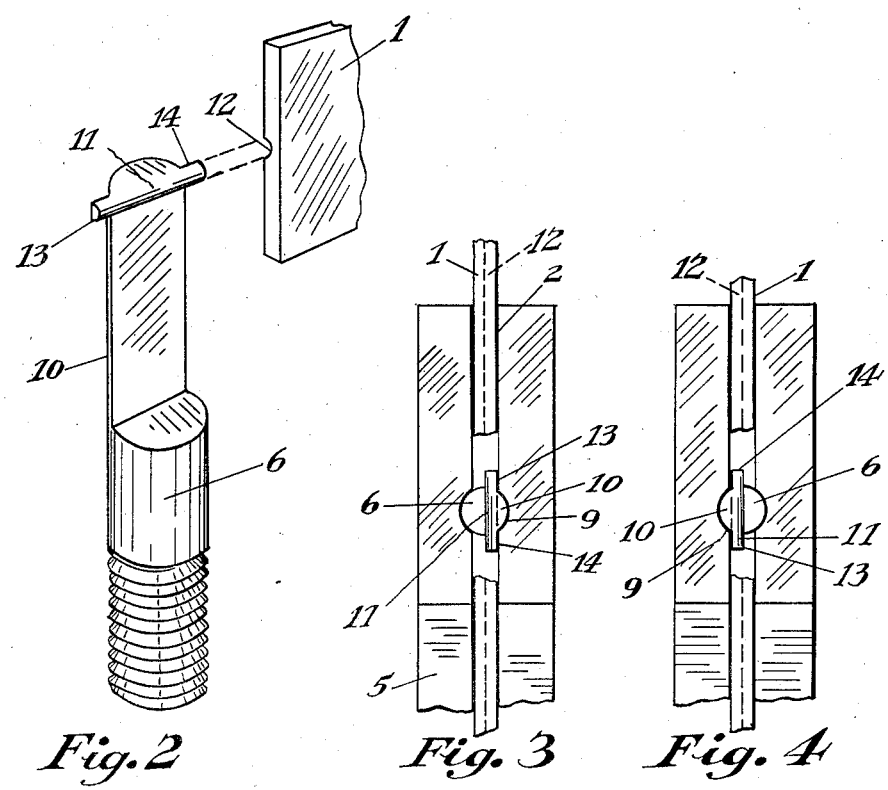
INVENTOR.
EUGENE J. WITCHGER
BY
George B. Willcox.
ATTORNEY Patented July 5, 1938

2,122,875

UNITED STATES PATENT OFFICE 2,122,875

TRY-SQUARE

Eugene J. Witchger, Saginaw, Mich., assignor to The Lufkin Rule Company, Saginaw, Mich., a corporation of Michigan Application November 4, 1937, Serial No. 172,700

1 Claim. (Cl. 33—103)

This invention relates to squares and the improvement claimed herein pertains specifically to the clamping bolt that releasably clamps together the head and the slidable and reversible rule.

The invention provides a simple and inexpensive bolt structure the object of which is to insure a more positive, convenient, and satisfactory means for reversing the facing position of the bolt in the slot of the head and for holding it in accurate alinement with the groove in the rule. It thereby facilitates the reinsertion of the rule into the head after it has been removed and reversed, and increases the usefulness and satisfactory operation of the square.

Fig. 1 is a side view of a square embodying my invention, part of the head being broken away; the position of the clamping bolt when raised for rotating it into about-face position being indicated by dotted lines.

Fig. 2 is an enlarged fragmentary detail view showing the relative positions of the bolt and rule ready to be assembled.

Figs. 3 and 4 are enlarged fragmentary views of the assembled head, bolt, and rule as seen in the direction of the arrow, Fig. 1; Fig. 3 showing the bolt and rule in one position, and Fig. 4 the same parts in about-faced position.

My improvement is adapted to be applied to a known try-square of the kind illustrated in Fig. 1, and more specifically is found in the bolt structure shown in Figs. 2, 3, and 4.

Referring now to the try-square in general, a rule 1 formed with a groove along one face is received in a slot 2 of head 3. The head has two working faces 4, 5, one for use as a try-square, the other as a miter square. The rule which is slidable lengthwise can be removed from the slot and replaced after having been turned end-for-end, or else faced about from obverse position to reverse, or both.

The rule is releasably fastened to the head in any of these positions by means of a clamping bolt 6 and a knurled nut 7. A compressible spring 8 is interposed between the nut 7 and the head 4 to hold the rule in the slot preliminary to being clamped therein. Bolt 6 is inserted into a bore hole 9 in the head 4. The axis of the bore is in the plane of slot 2, so that the rule when inserted shall bisect the bore hole. The bolt 6 is cut away at one side so as to present a segment-shaped finger 10 alongside a face of the rule. On finger 10 is a transverse wale or bead 11 the front of which is received in a groove 12 along one face of the rule. Tightening the nut 7 clamps the rule 1 to the head 3, and loosening the nut allows the rule to be slid in the slot to any desired lengthwise adjusted position.

The rule 1 has different measuring scales along its four longitudinal margins. Consequently it has to be mounted on the head 3 so that any of the several scales can be used at will. Such use requires the rule to be turned end-for-end, or changed as to its faces from obverse to reverse, or both.

In try-squares of the kind above described, the means heretofore employed for clamping the rule to the head was not well suited for making such adjustments easily and quickly. The earlier bolt was constructed so that it could accidentally turn in the bore 9 while the rue was detached from the head. Wale 11, instead of staying in alinement with the rule 1 and in register with groove 12, as indicated in Figs. 1, 2, 3, and 4, would accidentally turn more or less crosswise of the slot 2 so that the rule could not be reinserted without rearranging the position of the bolt, an inconvenient operation that had to be done blindly because the end of the bolt and its wale 11 were concealed within the slot. Moreover, the knurled nut 7, being itself rotatable on the bolt, was an unsatisfactory and erratic means by which to justify the alinement of the rule 11, the slot 2, and the groove 12.

My improvement overcomes this disadvantage of the earlier devices by constructing the clamping bolt so it can not be accidentally rotated when its wale 11 is within the slot 2 of the head.

Wale 11 is provided with end portions 13, 14 that project beyond the edges of finger 10, the backs of members 13, 14 being substantially in the plane of the inner wall of the finger so as to overlap and be guided by the side wall of slot 2 along both marginal edges of the bore 9, as is shown in Figs. 3 and 4.

With this arrangement the bolt 6 can not accidentally rotate to prevent the blade from entering the slot. Wale 11 is received in the groove 12 of the blade, as is indicated diagrammatically at the right-hand side of slot 2 in Fig. 3. When the blade is reversed as to its facing direction groove 12 will then be on the left, as shown in Fig. 4, bolt 6 will also be rotated half a turn and its projections 13, 14 will then be against the left-hand wall of slot 2.

The bolt 6 is easily rotated by pushing it upwardly to the position shown by dotted lines, Fig. 1, above the top of head 3. The spring 8 is thereby compressed, and when wale 11 is clear of the slot 2, the bolt is given half a turn, the spring draws it down into the slot 2, with wale 11 in position to engage groove 12 of rule 1 in the new position, indicated by Fig. 4.

By means of the improvements described herein the rule can be removed from the head and replaced, either in its original position, or in any inverted or reversed position more easily and the implement is rendered more convenient and satisfactory under the conditions of ordinary use of a try-square.

Wale 11, because of its laterally projecting end portions 13 and 14 can never be accidentally turned crosswise in the slot, but must always be parallel thereto as shown in Figs. 3 and 4.

By merely pushing the bolt 6 clear of the head and rotating it half a turn, wale 11 is shifted from right-hand position (Fig. 3) to left-hand (Fig. 4), and upon being lowered again into the slot by the action of spring 8 it is constrained to be parallel with the slot and with the groove 12 of rule 1, and is ready to engage and clamp the rule.

For purposes of describing the type of instrument to which my improvement is applicable I have shown as an example a try-square. However, the device is applicable to die makers' squares, center heads, protractors, and similar tools, and it will be understood that in these specifications and claims the term "try-square" is intended to include them.

In some earlier constructions the bolt was prevented from being accidentally turned so as to prevent inserting the rule, but that was done by embossing or swaging a key on the side of the bolt and cutting a corresponding concealed keyway in the head along the bore. The difficulty of locating the key and its keyway properly with relation to the wale 11 was a source of inconvenience and expense in manufacturing. This objection is overcome by my present improvement.

Having thus described my invention, what I claim and desire to secure by Letters Patent is:

In a square wherein a rule formed with a groove along one face is releasably secured to a head slotted to receive the rule, said head being formed with a bore in the plane of the slot, and a clamping bolt received in the bore, its upper portion being formed to present a finger, a transverse wale on the finger, the front of the wale being formed to be received in the groove of the rule, said wale having end portions that project beyond the edges of the finger, the back of the said projecting portions of the wale being formed to engage a side wall of the slot in the head.

EUGENE J. WITCHGER.